C. W. McLAUGHLIN AND H. F. RODGERS.
POT HANDLING MACHINE.
APPLICATION FILED MAR. 16, 1920.

1,413,176.

Patented Apr. 18, 1922.
6 SHEETS—SHEET 2.

Inventor
C. W. McLaughlin
H. F. Rodgers.

By [signature] Atty

UNITED STATES PATENT OFFICE.

CHARLES W. McLAUGHLIN, OF LOCK NO. 4, AND HARRIS F. RODGERS, OF CHARLEROI, PENNSYLVANIA.

POT-HANDLING MACHINE.

1,413,176.  Specification of Letters Patent.  Patented Apr. 18, 1922.

Application filed March 16, 1920. Serial No. 366,276.

*To all whom it may concern:*

Be it known that we, CHARLES W. MC-LAUGHLIN and HARRIS F. RODGERS, citizens of the United States, residing at Lock No. 4 and Charleroi, in the county of Washington and State of Pennsylvania, have invented certain new and useful Improvements in Pot-Handling Machines; and we do hereby declare the following to be a full, clear, and exact description of the invention, such as will enable others skilled in the art to which it appertains to make and use the same.

Our invention is a machine for handling pots containing molten substances such as glass or metal, its principal object residing in the provision of a machine which will facilitate the removal of the heavy pots from the furnace and carry the same to the pot dump, or to reset the pots in the furnace.

The invention has as another object the provision of a portable carrier which may be propelled to the furnace and then operated to lift the pot and extract the same from the furnace, the machine being then run to a point known as the pot dump, and the pot supporting mechanism operated reversely to deposit the pot in the pot dump.

It is another object of the invention to provide a portable pot handling machine which includes a plurality of longitudinally movable pot engaging and supporting bars that are capable of being disposed in different planes so that the pot may be readily engaged therewith and supported in a horizontal plane while the machine is being propelled from one point to another, and which pot engaging and supporting bars are operated through the medium of a novel mechanism.

A further object of our invention is to provide a machine of the above mentioned character which has associated therewith, a scraper or cutter for dislodging the molten glass or other material from the bench of the furnace, the cutter or scraper being capable of being operated at different angles with respect to the longitudinal axis of the machine, thus any point of the furnace bench may be reached and cleaned.

Still another object of our invention resides in the provision of a portable pot handling machine, the parts of which are so arranged as to be conveniently reached and operated by the operator.

With the above and other objects and advantages in mind, the invention consists in the novel combination of elements, constructions and arrangements, operations and the specific features all of which to be hereinafter enlarged upon and recited in the subjoined claims, a practical embodiment of the invention being illustrated in the attached drawings, wherein

Figure 3 is a like view showing the pot engaging and supporting bars in extended position within the furnace to engage beneath the pot, the dotted line position of the bars illustrating the final position of the same in removing the pot from the furnace.

Referring in detail to the drawings wherein like characters of reference denote like parts throughout the several views, the numeral 5 designates the frame of our improved machine which includes parallel side walls 6 and a bottom 7. The forward ends of the side walls 6 are connected by a vertical end wall 8 which constitutes a heat guard to protect the operator of the machine against the intense heat of the furnace.

The frame 5 is supported on traction wheels 9 disposed at the forward end of the frame to which are attached gear wheels or pinions 10. Extending transversely across the frame in the drive shaft 11 provided with gear wheels or pinions 12 upon its ends which mesh with the gear wheels 10 to impart motion to the wheels 9.

Disposed longitudinally of the frame is a main drive shaft 13 driven by an electric motor 14. Power is transmitted from the drive shaft 13 to the shaft 11 through the medium of a differential designated journalling at 15. A clutch 16 is mounted upon the shaft 13 and is operated by a hand lever 17.

Disposed at the opposite end of the frame is a swiveled steering wheel 18. This steering wheel depends from a horizontally disposed worm gear 19 supported in a suitable circular track 20 disposed upon the under face of the bottom 7 of the frame. This worm gear 19 is operated by a worm shaft 21, the latter being operatively connected to a hand steering wheel 22 mounted on the bottom 7 adjacent the forward end thereof, through the medium of gearing designated at 22$^a$.

A source of power which may be any conventional type of electric battery is contained within a box designated at 23 and is in circuit with the motor 14 and which is controlled by one of a plurality of levers 24 of a controller box 25. Disposed upon the outer face of the wall 8 centrally of its ends is a vertically disposed bracket member 26. An L-shaped pot tilting member is designated at 27, the vertical leg of this member being formed with a vertical tongue 28 snugly received within the bracket member 26 and is vertically movable therein. The horizontal leg 27$^a$ of this member extends forwardly of the machine and on the level with the floor or bench of the furnace. The forward end of this horizontal leg of the pot tilting member is beveled at 27$^b$ so that the same will readily engage beneath the pot to tilt the same upon the upward movement of the pot tilting member. A reinforcing or bracing element 29 connects the two legs of this member. In order to raise and lower the L-shaped pot tilting member 27 there is provided a threaded shaft 27$'$ passing through an interiorly threaded bearing 28$'$ formed upon the inner face of the tongue 28. The lower end of the shaft 27$'$ carries the pinion 29$'$ meshing with a drive pinion 29$''$ fixed to a counter shaft 13$^a$. Shaft 13 has a clutch 30$'$ loose thereon and engageable by clutch 16 to raise or lower the pot tilting member through the medium of gear 30$^a$ on the clutch 30$'$ and a gear 30$^b$ on shaft 13$^a$.

Disposed on the bottom 7 and against the sides 6 are parallel vertically disposed inverted U-shaped guides 30, these guides being arranged in transverse alinement.

Figures 4, 7:
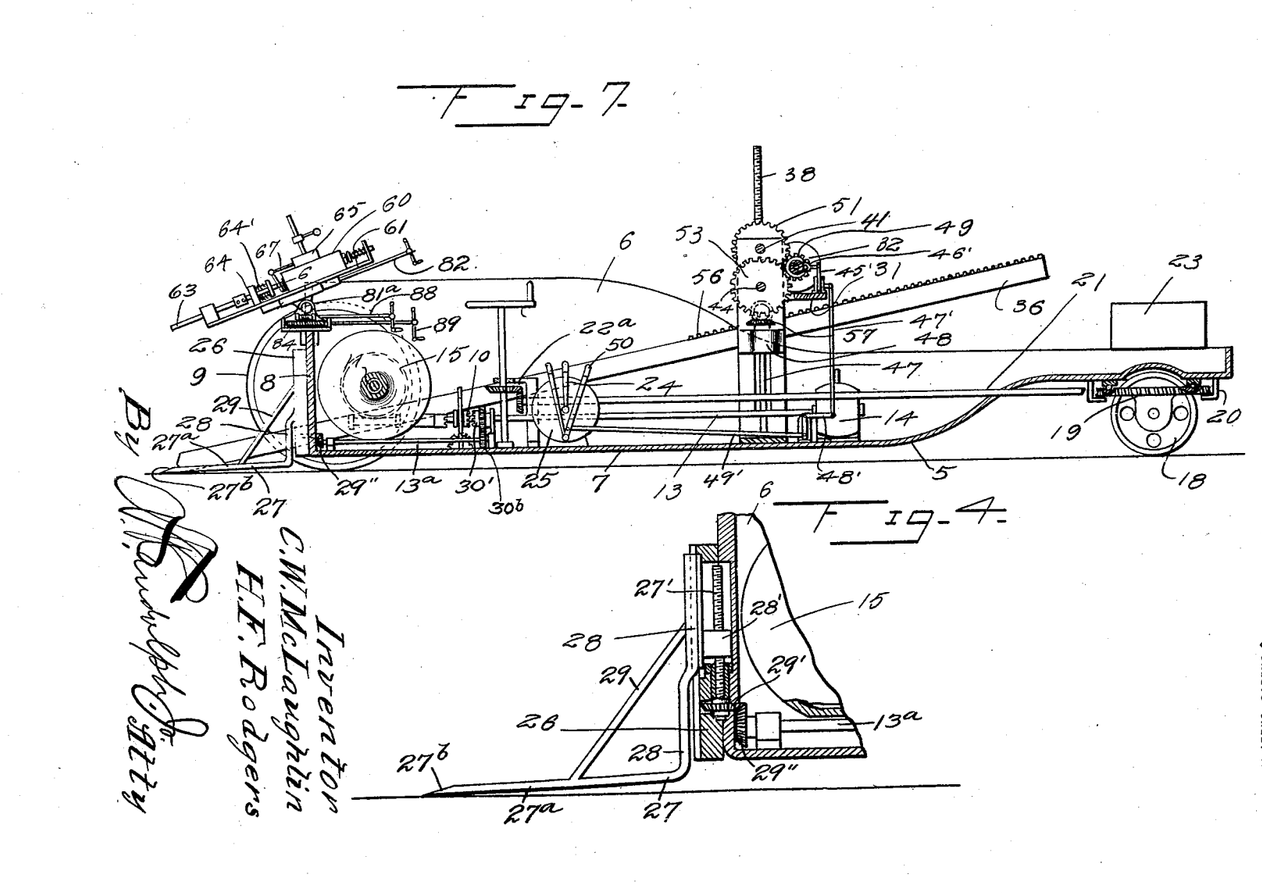
Figure 4 is a fragmentary view partly in elevation and partly in section of the pot tilting mechanism.
Figure 7 is a longitudinal sectional view of the machine taken on line 7—7 of Figure 1.
Figure 5:
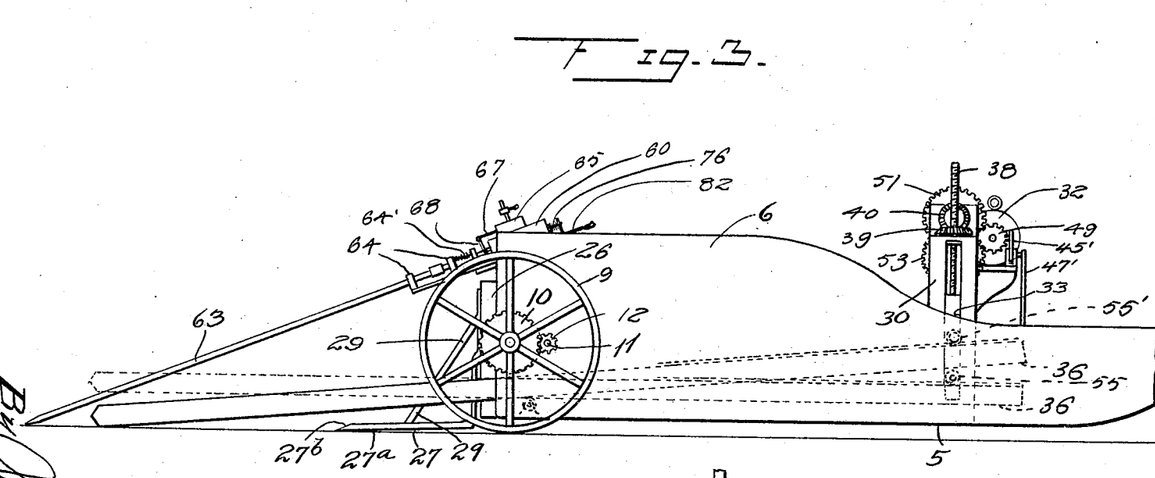
Figure 5 is a transverse sectional view taken on line 5—5 of Figure 1.
Figure 14:
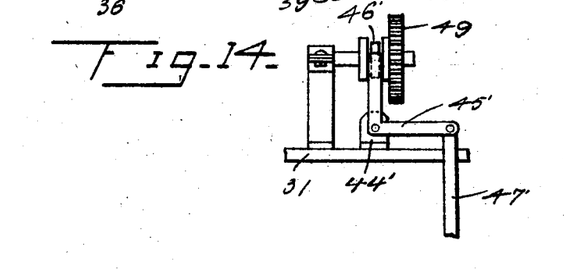
Figure 14 is a detail view in side elevation of the motor gear and the shifting mechanism therefor.

Extending transversely across the frame 5 and supported upon the upper edges of the side walls 6 is a shell or platform 31 upon which a motor 32 is supported and is in circuit with the source of power designated at 23 and is controlled by one of the levers 24 of the control box 25. Vertically adjustable in the guides 30 are blocks or carriages 33, each of which is provided with a substantially rectangular opening 34, the lower wall of each of these openings being rounded as indicated at 35. Movable longitudinally through the openings 34 in the blocks or carriages and capable of being disposed at different angles with respect to the horizontal axis of the machine is a pair of coacting pot engaging and supporting bars 36 which are movable through elongated openings 37 adjacent the lower edge of the forward wall 8 and are adapted to be extended within the furnace. Threaded shafts 38 extend vertically through the guides and have their lower ends swiveled in the carriages 33 and engaged with the shafts 38 are interiorly threaded horizontally disposed gears 39 which mesh with gears 40 fixed to a shaft 41 and supported in bearings 42 on the upper ends of the guides 30. Integral with the upper ends of these guides 30 are angle brackets 43. Journaled in the vertical legs of the angle brackets 43 is a shaft 44 carrying pinions 45 upon its ends which mesh with pinions 46 fixed to the upper ends of vertically disposed shafts 47 that are disposed in bearings 48 formed on the sides of the carriages 33 and which have their upper ends journaled in the horizontal legs of the angle brackets 43. A gear 49 is slidably mounted upon the shaft of the motor 32 and in order to shift this gear there is provided a bell crank lever 45$'$ mounted upon the bracket 44$'$ (see Figure 14) to rock in a vertical plane and is disposed to one side of the gear 49 and extending laterally from the upper end of this bell crank lever is a forked member 46$'$ having operative connection with the gear 49. A vertically disposed link 47$'$ has one end pivotally connected with the opposite end of the bell crank lever and its opposite end pivotally connected with one end of a second bell crank lever 48$'$, (see Figure 7) the opposite end of the bell crank lever 48$'$ having operative connection with a horizontally disposed link 49$'$ which is adapted to be shifted by a hand lever 50 arranged adjacent the controlling mechanism. A gear 51 is fixed to rotate with the shaft 41 while a gear 52 is fixed to rotate with the shaft 44, either of these gears being adapted to be engaged by the slidable gear 49 as will be hereinafter fully explained. A stub shaft 54 is provided for each of the guides and extending transversely through the blocks or carriages 33 fixed to the shaft and disposed within the openings in these blocks are pinions 55 which mesh with rack teeth 56 formed upon the upper face of the coacting pot engaging and supporting bars 36. The rack teeth 56 stop short of the longitudinal edges of the upper face of the bars 36 to afford track ways 54' which are engaged by rollers 55' journalled on the shafts 54. The purpose of these rollers is to relieve pinions 55 of the weight of the bars 36.

In order to transmit power to the pinions 55 to move the rack bar longitudinally, the vertical shafts 47 are provided with gears 57 disposed above the bearings 48 and meshing with pinions 58 upon the inner ends of the shaft 54. It will be manifest that in order to raise or lower the blocks or carriages 33 in the guides the sliding gear 49 is thrown into operative engagement with the gear 51 on the shaft 41 which in turn transmits power to the interiorly threaded gear 39 to feed the threaded rods 38 therethrough and that after these blocks or carriages have been adjusted to the required height the sliding gear 49 is then thrown into operative engagement with the gear 53 which transmits power to the shaft 44 to rotate the shafts 47 which in turn transmits power to the stub shafts 54 to rotate the pinions 55 to move the pot engaging bars longitudinally through the openings 37.

Figure 6:
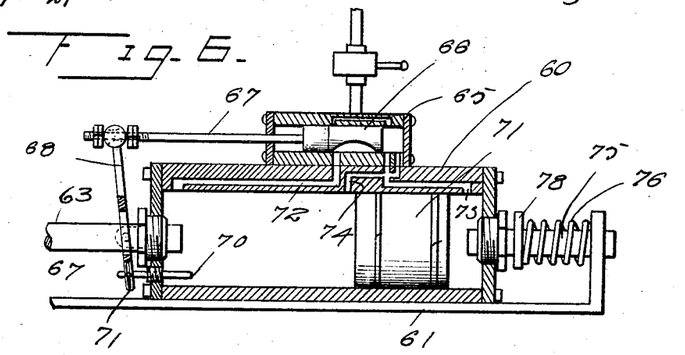
Figure 6 is a detail sectional view of the mechanism for operating the cleaner bar.
Figures 8, 12:
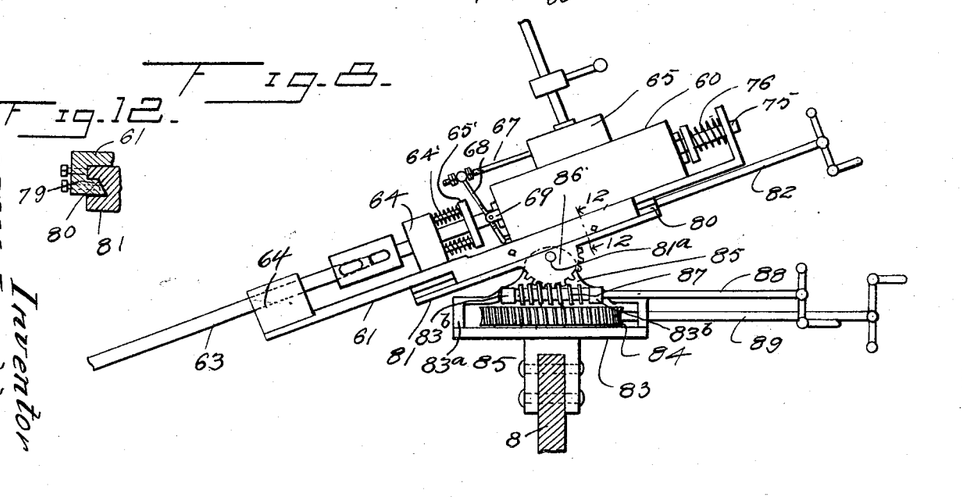
Figure 8 is an enlarged fragmentary view of the cleaner or scraper bar and the controlling mechanism therefor.
Figure 12 is a transverse sectional view taken on line 12—12 of Figure 8.
Figure 9:
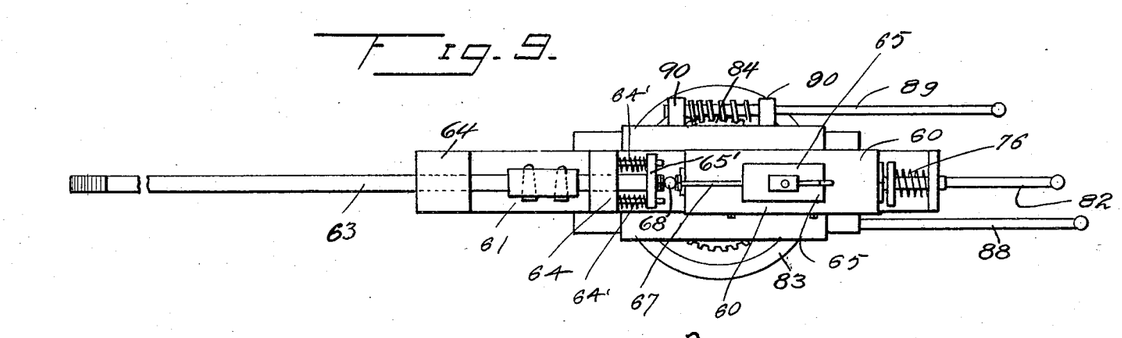
Figure 9 is an enlarged plan view of the cleaner bar guide and the control mechanism.
Figure 13:
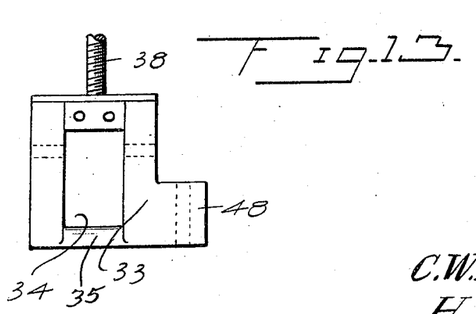
Figure 13 is a detail view in side elevation of one of the blocks or carriages.

In conjunction with the pot lifting and carrying mechanism I provide a mechanism for cleaning or scraping the molten glass and burnt sand from the furnace bench around the pot and which consists of an air cylinder 60 which is in communication with a source of steam or compressed air (not shown). The cylinder is mounted upon a bed plate 61 and a reciprocable cleaner bar 63 is slidably mounted in one end wall of cylinder 60 and in bearings or guides 64 on the bed plate. The cylinder 60 is provided with the usual steam chest 65 in which is mounted a conventional D-valve 66 from which extends an operating rod 67 operatively connected with a rocker arm 68 pivoted to an outstanding ear of cylinder 60 at 69. The lower end of this rocker arm 68 is connected to one end of a slidable pin 70 passing through the adjacent wall of cylinder 60 through the medium of a pin and slot connection 71. This pin 70 is adapted to be engaged by a piston 71 under impact in the cylinder 60 to move the D-valve in one direction. The cylinder 60 is provided with inlet ports 72 and 73 which open at the opposite ends of the piston and communicate with the steam chest. An exhaust port 74 is also provided in the piston 60 which intersects the inlet port 73 and upon the exhaust of the steam from the cylinder 60 after actuating the piston in one direction passes through this exhaust port into the steam chest for exhaust through suitable mechanism. The operation of the control mechanism described is as follows: Assuming the parts are in the position illustrated in Figure 6 with the steam or air passing from the chest 65 through the port 73 and behind the piston 71, such piston 70 slides toward the forward end of the cylinder and into engagement with the slidable pin 70 and the inner end of the cleaner bar 63 moving the same longitudinally in one direction. When the piston 71 strikes the pin 70 the D-valve will be shifted to uncover the port 72 and to close the ports 73 and 74, the steam passing then from the steam chest into the cylinder 60 to the opposite side of the piston. After the piston has passed beyond the port 74 upon its return stroke the steam passes from the cylinder 60 into the steam chest to exhaust. Immediately upon the start of the piston in its movement away from the pin 70 the reciprocatory cleaner bar is returned to its normal position through the medium of the expansible coil spring 64' bearing against the cross head 65' mounted on the bar 63 and slidable in adjacent bearing 64.

In order to cushion the rearward thrust of the piston 71 we provide a slidable plunger 75 one end of which projects into the cylinder through the rear end and its opposite end is slidable in the upturned end of the bed plate 61, this plunger being yieldably held by an expansible coil spring 76 engaging the upturned end of the bed plate and a stop 78 on the plunger. The bed plate 61 forms a carriage provided with longitudinal tongues or ribs 79 upon its inner faces which are slidably disposed in grooves 80, of a carriage support 81. The carriage or bed plate 61 is adjusted longitudinally in the carriage support by a hand operated threaded shaft 82 having threaded engagement with the carriage support and having one end swivelled to the carriage. A horizontally disposed plate or bracket 83 is mounted upon the upper end of the forward wall of the machine upon which a horizontally disposed worm wheel 84 is journaled. The bracket 83 has an upper section 83$^a$ to move from the axis of wheel 84, which carries an upstanding ear 85 to which support 81 is pivoted at 81$^a$ concentrically of a toothed segment 86 formed on the carriage support whereby the bar 63 may be adjusted at any angle with respect to the floor. Bearings 83$^a$ are formed on bracket section 83 above the worm wheel 84 and journaled in the bearings is a worm shaft 87 engaging the tooth segment 86 so that through rotation of the worm shaft the carriage support 81 will be adjusted to and dispose the cleaner blade at the desired angle or position with respect to the floor. A worm shaft 89 is journaled in bearings 90 upon the plate 83 and is engaged with the worm wheel 84 to rotate the same so that the carriage support and cleaner bar will be disposed at any angle with respect to the longitudinal axis of the machine.

It will be seen that the cylinder may be adjusted about a vertical and horizontal axis so that the cleaner bar may be operated at any angle with respect to the longitudinal axis of the machine so that any point of the furnace bench may be reached. It will also be stated that when the machine is being used to lift the pot from the furnace, the cleaner bar is disengaged from its mounting so that the machine may be brought up close to the furnace.

Figure 1:
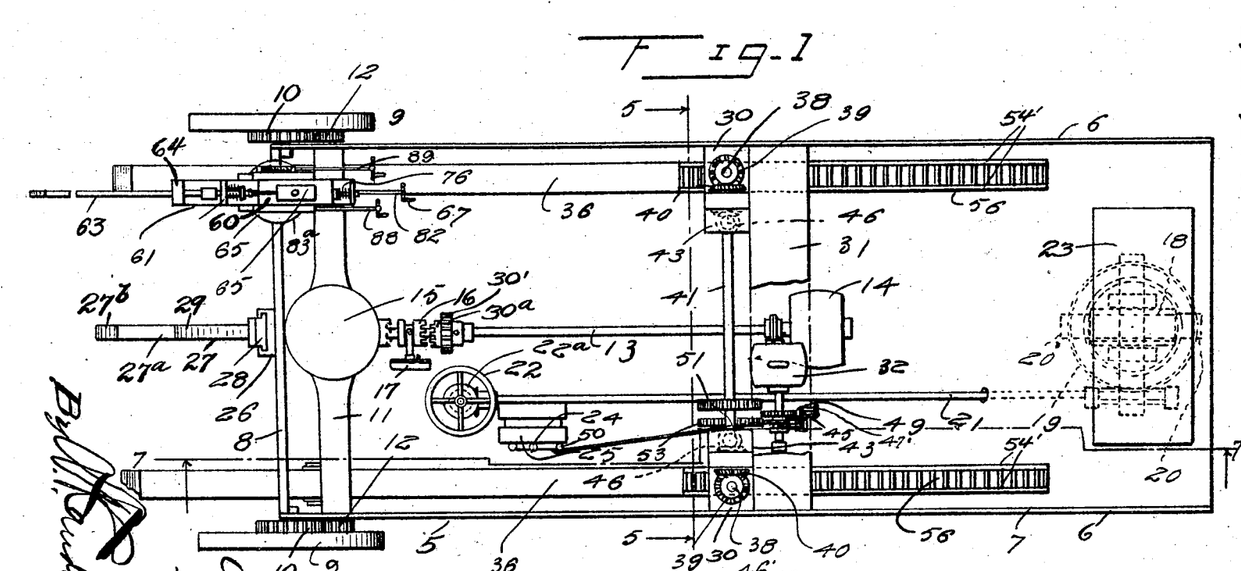
Figure 1 is a top plan view of a pot handling machine constructed in accordance with our invention.
Figures 2, 10, 11:
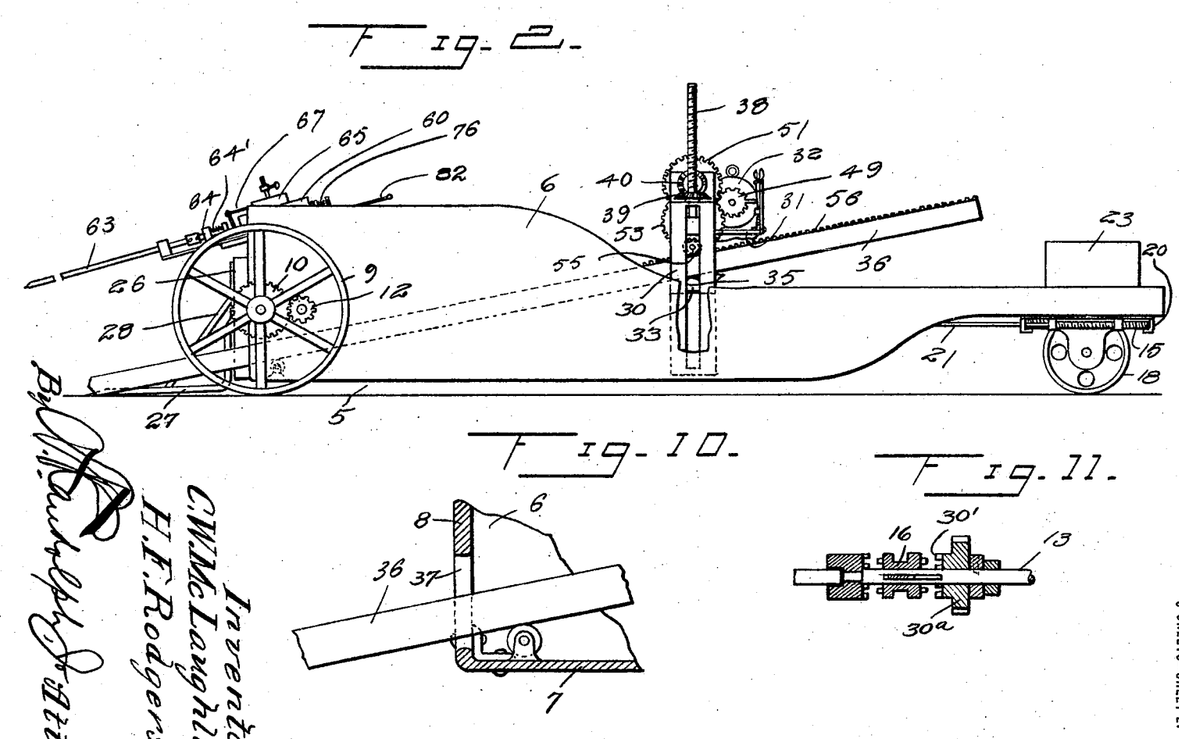
Figure 2 is a side elevation of the machine illustrating the pot engaging and supporting bars in inoperative or retracted position.
Figure 10 is a fragmentary view of one of the pot lifting bars and the body of the machine.
Figure 11 is a detail view of the clutch embodied in the invention.

In the operation of the machine the same is propelled to the front wall of the furnace so that the horizontal and forwardly extending leg 27ª of the pot tilting member 27 will engage the pot at one edge to tilt the same upon its opposite edge upon upward movement of the pot tilting member 27. The bars 36 being in retracted position as illustrated in Figure 1, the sliding gear 49 is thrown into mesh with the gear 51 to impart motion to the internally threaded gears 39 to feed the threaded shafts 38 therethrough to lower the blocks or carriages 33 downwardly to the required height which in turn lowers the raised ends of the bars sufficiently to permit the same to be moved longitudinally within the furnace to the position illustrated in Figure 2, this being accomplished by throwing slidable gear 49 into engagement with the gear 53 which transmits power to the pinions 55 to move the bars. With the bars 36 engaged beneath the pot as illustrated in full lines in Figure 3, the slidable gear 49 is again thrown into engagement with the gear 51 to advance the blocks to a lower point and with the lower walls of the openings 37 constituting fulcrums for the bars 36 the latter are swung to a horizontal position to elevate the pot. The operator then drives the machine away from the furnace and upon reaching the pot dump reverses the operation of the machine to cause the blocks or carriages to move upwardly so that the forward ends of the bars will engage the floor, and then retract the bars to the position illustrated in Figure 1 through the medium of the mechanism described thus disengaging or releasing the pot.

While the embodiment of the invention shown and described is a practical one, it will be stated that the same may be modified and that our limits of modification are only governed by what is claimed.

What is claimed is:—

1. In a pot lifting machine, a portable frame, longitudinally movable coöperative bars supported on the frame, and means for advancing the bars forwardly of the frame beneath and at an angle with respect to and directly against the object to be lifted, and to tilt the bars simultaneously to lift the object after advancing movement thereof.

2. A lifting machine including a movable frame, a forwardly extending and vertically movable member adapted to engage one end of an object to tilt the same, and means capable of being advanced beneath the object at an angle thereto and then moved to a horizontal position to lift and support the object thereon.

3. In a lifting machine a movable frame, an object tilting means carried thereby, and members movable parallel to each other to engage beneath the object, said members being capable of being moved to a horizontal position to elevate and support the object thereon.

4. In a machine of the character described a frame, a plurality of coacting bars movable substantially longitudinally of the frame and adapted to engage beneath and directly against an object to be lifted, means for imparting such movement to the bars, and means to tilt the bars to position subsequently to the longitudinal movement thereof to lift the object.

5. In a lifting machine a frame, bars movable forwardly and rearwardly of the frame and at an angle with respect to the ground to engage beneath directly against an object to be lifted, gearing for imparting such movement to the bars, and gearing for raising the bars as levers after advancing the same.

6. In a lifting machine, a portable frame, an object tilting member disposed forwardly of the frame and having its forward end beveled to facilitate its engagement with the object to tilt the same upon one edge, and a plurality of coacting object engaging and lifting members movable at an incline towards and away from the object, and means for rocking the bars to assume a horizontal position to elevate the object.

7. A lifting machine including a support, and a plurality of bars capable of being advanced forwardly of the machine to engage beneath and directly against an object and subsequently rocked to elevate the object.

8. In a lifting machine, a support, and a plurality of coacting bars adapted to be advanced forwardly of the machine and at an incline with respect to the ground and engaged beneath and directly against an object and subsequently rocked to elevate the forward ends thereof to lift the object.

9. In a lifting machine, a support, and a plurality of bars movable forwardly of the machine and fulcrumed intermediate their ends, and means for advancing the bars forwardly towards the object and at an incline to facilitate the engagement of the forward ends of the bars beneath an object, and means to rock the bars to elevate the forward ends thereof to lift the object and support the same.

10. In a lifting machine, a wheeled frame, a tilting member disposed forwardly of the frame and adapted to extend through an opening in a furnace to tilt an object, and a plurality of coacting bars movable parallel to each other to engage beneath and directly against the object, the bars being capable of being arranged in a substantially horizontal plane after engagement beneath the object to lift the same.

11. In a pot lifting machine, a wheeled frame, a pot tilting member disposed forwardly of the frame and having a horizontal leg to engage beneath the pot to tilt the same upon one edge thereof, means for raising and lowering said members, and means to be advanced forwardly of the machine beneath the pot to raise the same and support the same.

12. In a pot lifting machine, a wheeled frame, a pot tilting member disposed forwardly of the frame and having a leg disposed in a horizontal plane and adapted to engage the pot, means for raising said member to tilt the pot, and a plurality of bars movable parallel to each other and to the bottom of the tilted pot, said bars being capable of being arranged in a horizontal plane after engagement of the same with the pot, to lift the latter.

13. In a pot lifting machine, a pot tilting member including a horizontally disposed forwardly extending leg adapted to engage the forward edge of a pot to tilt the same, and a plurality of pot engaging bars capable of longitudinal movement towards the pot and capable of rocking movement after engagement beneath the pot to elevate the same.

14. In a pot lifting machine, a wheeled frame, a pot tilting member including a forwardly extending horizontally disposed leg adapted to engage beneath the pot upon advancing of the machine towards the pot, means for raising and lowering the tilting member, and a plurality of bars movable at an angle with respect to the pot engaging member and adapted to engage beneath the pot, the bars being fulcrumed intermediate their ends after being arranged in extended position, and means to rock the bars to elevate the forward ends thereof to elevate the pot.

15. In a lifting machine, a wheeled frame including a vertically disposed forward end wall provided with elongated openings adjacent its lower edge, pot engaging bars movable through the openings at an incline to pass beneath the pot, and means to rock the bars to elevate the pot, the lower end walls of the openings constituting fulcrums for the bars when in extended position.

16. In a pot lifting machine, a wheeled frame, a pot tilting member disposed in a horizontal plane forwardly of the frame and adapted to engage the forward edges of the pot to tilt the latter, a plurality of bars capable of being advanced forwardly of the machine and at an incline to engage beneath the pot, guides supported on the frame, carriages vertically movable in the guides and provided with openings through which the bars pass, and means for raising and lowering the carriages to cause the bars to assume various angular positions.

17. In a machine of the character described, a wheeled frame, means disposed forwardly of the frame to tilt an object upon one edge thereof, vertically disposed guides supported on the frame, carriages movable vertically in the guides and provided with openings, a plurality of object engaging and supporting bars, means for moving the carriages to dispose the bars the proper incline when engaging beneath the object, and means carried by the carriages for advancing the bars forwardly of the machine, the carriages then being moved to a position to rock the bars to a horizontal position to elevate the object.

18. In a lifting machine, a wheeled frame, means disposed forwardly of the machine for engagement with an object to tilt the same upon one end, vertically disposed guides arranged on the frame, carriages movable in the guides, cooperating object engaging and elevating bars operatively connected with the carriages, means for moving the carriages to dispose the bars at the proper incline to engage beneath the object, and means for advancing and retracting the bars at such an incline, the carriages being moved to a position to elevate the forward ends of the bars after engagement of the same with the object.

19. In an object lifting machine, a wheeled frame, means disposed forwardly of the machine to engage an object to tilt the same, vertically disposed guides on the frame, carriages vertically movable in the guides provided with openings, threaded shafts having their lower ends loosely connected with the guides, interiorly threaded gears disposed on the shafts for feeding the same through the gears to move the carriages, bars movable through the openings in the carriages and adapted to be arranged at various inclined positions, a motor, gearing associated with the motor adapted to be operatively engaged with the interiorly threaded gears to actuate the carriages to arrange the bars at various inclined positions, and gearing associated with the bars and motor whereby to advance and retract the bars, the bars being capable of being rocked to a horizontal position when in extended position, to elevate an object.

20. In a lifting machine, a wheeled frame, vertically disposed guides on the frame, carriages vertically movable in the guides and provided with openings, parallel object engaging bars slidably disposed in the openings in the carriages, a motor, gearing associated with the motor and carriages to raise and lower the same, and gearing associated with the bars and motor to be operated subsequently to the adjusting of the carriages to dispose the bars at the proper incline to engage beneath an object to advance the bars, the carriages being lowered to a point to elevate the forward ends of the bars subsequently to the advancing operation.

21. In a lifting machine, a wheeled frame, guides disposed vertically on the frame, carriages vertically movable within the guides and provided with openings, object engaging and elevating bars slidably disposed through the openings and capable of being advanced forwardly of the machine to engage beneath the object, teeth on the bars, gearing carried by the carriages and meshing with the teeth, a motor, gearing associated with the motor and carriages to move the same to dispose the bars at various angular positions, and gearing adapted to connect the motor and the gearing carried by the carriages to move the bars towards and away from the object, the bars being swung upwardly away from the ground subsequently to the advancing of the same to engage the object.

22. In a lifting machine, a wheeled frame, a motor for driving the wheels, means for steering the frame and bars capable of being advanced forwardly of the machine and at an incline to engage beneath an object, and means for locking the bars to elevate the forward ends thereof to lift an object thereon.

23. In a lifting machine a portable frame, vertically disposed inverted U-shaped guides supported on the frame in transverse alinement, carriages vertically adjustable in the guides and provided with openings, parallel object engaging and lifting bars slidable through the openings in the guides, teeth upon the upper face of the bars, vertically disposed threaded shafts having their lower ends loosely connected with the carriages, interiorly threaded gears disposed upon the stems, a motor, a shaft carrying pinions upon its opposite ends and meshing with the interiorly threaded gears, a second shaft, gearing carried by the carriages and operated by the second mentioned shaft, gears fixed to rotate with the said shaft, and a slidable gear rotated with the motor adapted to be moved into engagement with the gear on the first mentioned shaft to move the carriages to a point to dispose the bars at an incline, said gear on the first shaft being then thrown into engagement with the gear on the second mentioned shaft to advance the bars beneath the object to be lifted, the slidable gear being then thrown into engagement with the gear on the first mentioned shaft to lower the carriages whereby to elevate the forward ends of the bars to lift the object.

24. In a lifting machine, a portable frame, guides on the frame, vertically movable carriages in the guides provided with openings, parallel object engaging bars slidable through the openings and provided with teeth, a motor, gearing associated with the motor and carriages to adjust the same vertically, angle brackets disposed at the upper ends of the guides having vertical and horizontal legs, a shaft journaled in the vertical legs of the brackets and carrying pinions, a gear on the shaft adapted to be engaged with the motor, vertically disposed shafts journaled in the horizontal legs of the brackets carrying pinions meshing with the pinions upon the ends of the first mentioned shaft, gearing carried by the carriages to be driven by the vertical shaft, the bars being capable of being rocked to elevate the forward ends thereof after advancement of the same to lift an object.

In testimony whereof we affix our signatures in presence of two witnesses.

CHARLES W. McLAUGHLIN.
HARRIS F. RODGERS.

Witnesses:
GEO. W. RISBECK,
JOHN P. KULOW.